United States Patent
Miyashita et al.

(10) Patent No.: US 8,087,232 B2
(45) Date of Patent: Jan. 3, 2012

(54) EXHAUST SYSTEM OF INTERNAL COMBUSTION ENGINE

(75) Inventors: Shigeki Miyashita, Susono (JP); Naoya Kaneko, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 786 days.

(21) Appl. No.: 12/083,626

(22) PCT Filed: Dec. 7, 2006

(86) PCT No.: PCT/IB2006/003506
§ 371 (c)(1),
(2), (4) Date: Apr. 16, 2008

(87) PCT Pub. No.: WO2007/066210
PCT Pub. Date: Jun. 14, 2007

(65) Prior Publication Data
US 2009/0145116 A1 Jun. 11, 2009

(30) Foreign Application Priority Data
Dec. 8, 2005 (JP) .................. 2005-354661

(51) Int. Cl.
*F01N 5/04* (2006.01)
*F01N 3/00* (2006.01)
*F01N 3/10* (2006.01)

(52) U.S. Cl. .............. 60/280; 60/286; 60/287; 60/300
(58) Field of Classification Search .............. 60/280
See application file for complete search history.

(56) References Cited

U.S. PATENT DOCUMENTS

| 5,154,894 | A * | 10/1992 | MacFarlane et al. | 422/180 |
|---|---|---|---|---|
| 5,509,267 | A * | 4/1996 | Theis | 60/274 |
| 6,014,859 | A * | 1/2000 | Yoshizaki et al. | 60/285 |
| 6,138,453 | A * | 10/2000 | Sawada et al. | 60/277 |
| 6,151,890 | A * | 11/2000 | Hoshi | 60/297 |
| 6,324,893 | B1 * | 12/2001 | Watanabe et al. | 73/23.32 |
| 6,370,869 | B1 * | 4/2002 | Hirota et al. | 60/276 |
| 6,516,612 | B1 * | 2/2003 | Yokoi et al. | 60/301 |
| 6,564,543 | B1 * | 5/2003 | Orzel et al. | 60/277 |
| 6,770,116 | B2 * | 8/2004 | Kojima | 95/14 |
| 6,868,669 | B2 * | 3/2005 | Tanaka | 60/286 |
| 2003/0139739 | A1 * | 7/2003 | Doscher et al. | 606/28 |
| 2004/0068982 | A1 * | 4/2004 | Ueda et al. | 60/285 |
| 2004/0098977 | A1 * | 5/2004 | Kupe et al. | 60/286 |
| 2004/0112046 | A1 * | 6/2004 | Tumati et al. | 60/297 |
| 2004/0139739 | A1 * | 7/2004 | Kagenishi | 60/289 |
| 2006/0174607 | A1 * | 8/2006 | Mori et al. | 60/282 |
| 2006/0236682 | A1 * | 10/2006 | I et al. | 60/288 |

FOREIGN PATENT DOCUMENTS
EP 716221 A1 * 6/1996
(Continued)

*Primary Examiner* — Thomas Denion
*Assistant Examiner* — Jason Shanske
(74) *Attorney, Agent, or Firm* — Oliff & Berridge, PLC

(57) ABSTRACT

In an exhaust system of an internal combustion engine having a plurality of cylinders, a control valve is disposed downstream of a junction point of one of two exhaust passages of the engine, and a control valve and a catalytic converter are disposed downstream of a junction point of the other of the exhaust passages. The control valves of the two exhaust passages are controlled so that exhaust gas of all of the cylinders mainly passages the catalytic converter of the other exhaust passage during startup of the engine.

2 Claims, 3 Drawing Sheets

FOREIGN PATENT DOCUMENTS

| | | |
|---|---|---|
| JP | B2-01-027246 | 5/1989 |
| JP | U-01-173423 | 12/1989 |
| JP | A-08-121153 | 5/1996 |
| JP | EP 0 716 221 A1 | 6/1996 |
| JP | A-11-141332 | 5/1999 |
| JP | A-2001-012234 | 1/2001 |

* cited by examiner

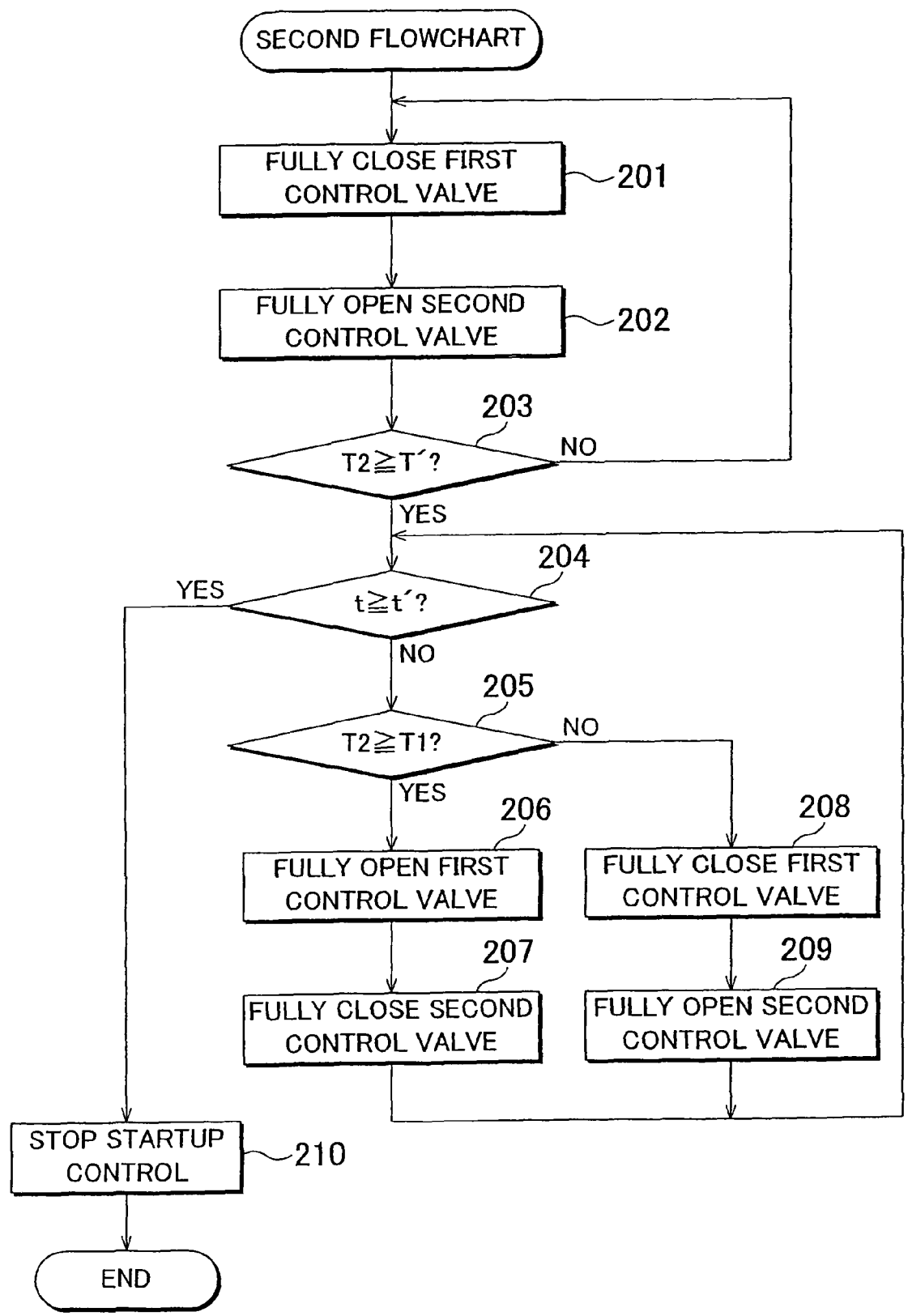

EXHAUST SYSTEM OF INTERNAL COMBUSTION ENGINE

BACKGROUND OF THE INVENTION

1. Field of the Invention

The invention relates to an exhaust system of an internal combustion engine.

2. Description of the Related Art

In an exhaust system of an internal combustion engine, such as a V-type engine, having a plurality of cylinders, all of the cylinders are divided into two cylinder groups, each of which is provided with an exhaust manifold, and an exhaust passage is provided for each of the cylinder groups such that the exhaust passage extends from the corresponding exhaust manifold to an exhaust merging point at which streams of exhaust gas from the respective exhaust passages join together. In the exhaust system of this type, it has been proposed that a turbine of a turbocharger and a catalytic converter downstream of the turbine are disposed only in one of the exhaust passages, and this exhaust passage communicates at a junction point upstream of the turbine with a junction point of the other exhaust passage, while a control valve is disposed downstream of the junction point of the other exhaust passage. An example of the thus constructed exhaust system is disclosed in, for example, JP-B2-1-27246.

In the arrangement as described above, the control valve is used as a wastegate valve of the turbocharger, and the control valve is closed during low-load engine operation in which a small amount of exhaust gas is produced, so that the exhaust gas of all of the cylinders passes the turbine. During high-load engine operation in which a large amount of exhaust gas is produced, the control valve is opened so that the exhaust gas of the other cylinder group passes the other exhaust passage, and only the exhaust gas of the above-indicated one cylinder group passes the turbine. In this manner, the boost pressure established by the turbocharger is constantly controlled to a set value or its vicinity.

In the meantime, during startup of the engine, it is necessary to warm up a catalytic converter early so as to activate a catalyst carried thereon, thereby to start treatment of exhaust gas at an early stage. In the exhaust system as described above, the control valve is closed during startup of the engine so that the exhaust gas of all of the cylinders passes the catalytic converter. However, the exhaust gas passes the turbine of the turbocharger before flowing into the catalytic converter, and the temperature of the exhaust gas is reduced during its passage through the turbine; therefore, the catalytic converter cannot be warmed up early.

It is an object of the invention to provide an exhaust system of an internal combustion engine, which is capable of early warm-up of a catalytic converter during startup of the engine.

SUMMARY OF THE INVENTION

In an exhaust system of an internal combustion engine having a plurality of cylinders according to a first aspect of the invention, all of the cylinders are divided into two cylinder groups, and a first exhaust passage and a second exhaust passage are connected to respective exhaust manifolds of the two cylinder groups, such that the first exhaust passage communicates with the second exhaust passage via a first junction point provided in the first exhaust passage and a second junction point provided in the second exhaust passage. The exhaust system includes a turbine of a turbocharger disposed downstream of the first junction point of the first exhaust passage, and a control valve disposed downstream of the second junction point of the second exhaust passage. In the exhaust system, another control valve is disposed downstream of the first junction point of the first exhaust passage, and a catalytic converter is disposed downstream of the second junction point of the second exhaust passage. The opening amounts of the control valves disposed in the first exhaust passage and the second exhaust passage are controlled so that exhaust gas of all of the cylinders mainly passes the catalytic converter during startup of the engine.

With the arrangement as described above, during startup of the engine, the exhaust gas of all of the cylinders mainly flows into the catalytic converter of the second exhaust passage in which the turbine is not provided, and, therefore, does not suffer from a reduction of the temperature of the exhaust gas due to its passage through the turbine. Thus, the exhaust system is capable of early warm-up of the catalytic converter.

In an exhaust system of an internal combustion engine having a plurality of cylinders according to a second aspect of the invention, all of the cylinders are divided into two cylinder groups, and a first exhaust passage and a second exhaust passage are connected to respective exhaust manifolds of the two cylinder groups, such that the first exhaust passage communicates with the second exhaust passage via a first junction point provided in the first exhaust passage and a second junction point provided in the second exhaust passage. The exhaust system includes a turbine of a turbocharger disposed downstream of the first junction point of the first exhaust passage, and a control valve disposed downstream of the second junction point of the second exhaust passage. In the exhaust system, another control valve is disposed downstream of the first junction point of the first exhaust passage, and an HC adsorption device may be disposed in the first exhaust passage downstream of the turbine, and the opening amounts of the control valves disposed in the first exhaust passage and the second exhaust passage may be controlled so that the exhaust gas of all of the cylinders mainly passes the HC adsorption device during a period from cranking to a point in time immediately after completion of startup of the engine.

With the arrangement as described above, the exhaust gas of all of the cylinders, which contains a large amount of unburned fuel until immediately after completion of startup of the engine, flows into the HC adsorption device disposed in the first exhaust passage, so that the HC adsorption device adsorbs the unburned fuel. Thus, the exhaust gas is prevented from flowing into the catalytic converter of the second exhaust passage before it is warmed up and from being discharged into the atmosphere without being cleaned so much, and release of the unburned fuel to the atmosphere can be suppressed.

In the exhaust system as described above, another catalytic converter may be disposed in the first exhaust passage downstream of the turbine.

With the above arrangement, when the engine operates at a low load during running of the vehicle, for example, the catalytic converter disposed in the first exhaust passage is able to clean the exhaust gas that has passed the turbine while the turbocharger performs supercharging.

In the exhaust system constructed as described above, a catalyst may be carried on the HC adsorption device.

With the above arrangement, when the engine operates at a low load during running of the vehicle, for example, the HC adsorption device, which also functions as a catalytic converter, is able to clean the exhaust gas that has passed the turbine while the turbocharger performs supercharging.

In the exhaust system as described above, when it is judged that warm-up of the catalytic converter disposed in the second exhaust passage is completed during startup of the engine, the opening amounts of the control valves disposed in the first exhaust passage and the second exhaust passage may be controlled so that the amount of exhaust gas that passes through the first exhaust passage becomes equal to or larger than the amount of exhaust gas that passes through the second exhaust passage.

With the above arrangement, the exhaust gas whose amount is equal to or larger than that of the exhaust gas passing the catalytic converter of the second exhaust passage is caused to pass the catalytic converter disposed in the first exhaust passage, so as to start warming up the catalytic converter of the first exhaust passage, in preparation for treatment of exhaust gas that passes the turbine, for example, during low-load engine operation while the vehicle is running.

In the exhaust system as described above, when it is judged that warm-up of the catalytic converter disposed in the second exhaust passage is completed during startup of the engine, the opening amounts of the control valves disposed in the first exhaust passage and the second exhaust passage may be controlled so that the exhaust gas of all of the cylinders mainly passes through the first exhaust passage.

With the above arrangement, the exhaust gas of all of the cylinders can be used for starting warm-up of the catalytic converter disposed in the first exhaust passage, in preparation for treatment of exhaust gas that passes the turbine, for example, during low-load engine operation while the vehicle is running.

In the exhaust system as described above, when it is judged that warm-up of the catalytic converter disposed in the second exhaust passage is completed during startup of the engine, the opening amounts of the control valves disposed in the first exhaust passage and the second exhaust passage may be controlled so that a larger amount of exhaust gas passes one of the catalytic converters disposed in the first exhaust passage and the second exhaust passage which has a measured or estimated temperature that is lower than the other.

With the above arrangement, the exhaust gas whose amount is larger than that of the exhaust gas passing the catalytic converter of the second exhaust passage is caused to pass the catalytic converter disposed in the first exhaust passage, so as to start warming up the catalytic converter of the first exhaust passage, in preparation for treatment of the exhaust gas that passes the turbine, for example, during low-load engine operation while the vehicle is running. Thereafter, it is determined which of the amounts of the exhaust gas passing the catalytic converter disposed in the first exhaust passage and the exhaust gas passing the catalytic converter disposed in the second exhaust passage should be larger than the other, so that the catalytic converter of the second exhaust passage and the catalytic converter of the first exhaust passage are kept at substantially the same temperature. As a result, the catalysts contained in the two catalytic converters are kept activated by substantially the same degree.

In the exhaust system as described above, it may be judged that warm-up of the catalytic converter disposed in the second exhaust passage is completed when a period of time for which the exhaust gas of all of the cylinders mainly passes the catalytic converter disposed in the second exhaust passage becomes equal to a set period of time.

With the above arrangement, completion of warm-up of the catalytic converter can be easily determined.

In the exhaust system as described above, it may be judged that warm-up of the catalytic converter disposed in the second exhaust passage is completed when a measured or estimated temperature of the catalytic converter disposed in the second exhaust passage reaches a set temperature.

With the above arrangement, completion of warm-up of the catalytic converter can be accurately determined.

An exhaust system of an internal combustion engine having a plurality of cylinders according to a third aspect of the invention includes: a first cylinder group and a second cylinder group which constitute all of the cylinders of the engine, a first exhaust passage and a second exhaust passage that are connected to respective exhaust manifolds of the first cylinder group and the second cylinder group, the first exhaust passage and the second exhaust passage having respective junction points through which the first and second exhaust passages communicate with each other, a turbine of a turbocharger disposed downstream of the junction point of the first exhaust passage, a first control valve disposed downstream of the junction point of the first exhaust passage, a second control valve disposed downstream of the junction point of the second exhaust passage, a catalytic converter disposed downstream of the junction point of the second exhaust passage, and a controller that controls the opening amounts of the first control valve and the second control valve so that exhaust gas of all of the cylinders mainly passes the catalytic converter during startup of the engine.

An exhaust system of an internal combustion engine having a plurality of cylinders according to a fourth aspect of the invention includes: a first cylinder group and a second cylinder group which constitute all of the cylinders of the engine, a first exhaust passage and a second exhaust passage that are connected to respective exhaust manifolds of the first cylinder group and the second cylinder group, the first exhaust passage and the second exhaust passage having respective junction points through which the first and second exhaust passages communicate with each other, a turbine of a turbocharger disposed downstream of the junction point of the first exhaust passage, a first control valve disposed downstream of the junction point of the first exhaust passage, a second control valve disposed downstream of the junction point of the second exhaust passage, an HC adsorption device disposed in the first exhaust passage downstream of the turbine and a controller that controls the opening amounts of the first control valve and the second control valve so that exhaust gas of all of the cylinders mainly passes the HC adsorption device during a period from cranking to a point in time immediately after completion of startup of the engine.

BRIEF DESCRIPTION OF THE DRAWINGS

The foregoing and/or further objects, features and advantages of the invention will become more apparent from the following description of preferred embodiments with reference to the accompanying drawings, wherein like numerals are used to represent like elements and wherein:

FIG. 3 is a second flowchart used for controlling the first control valve and the second control valve.

DETAILED DESCRIPTION OF THE PREFERRED EMBODIMENTS

In the following description, the present invention will be described in more detail in terms of exemplary embodiments.

Figure 1:
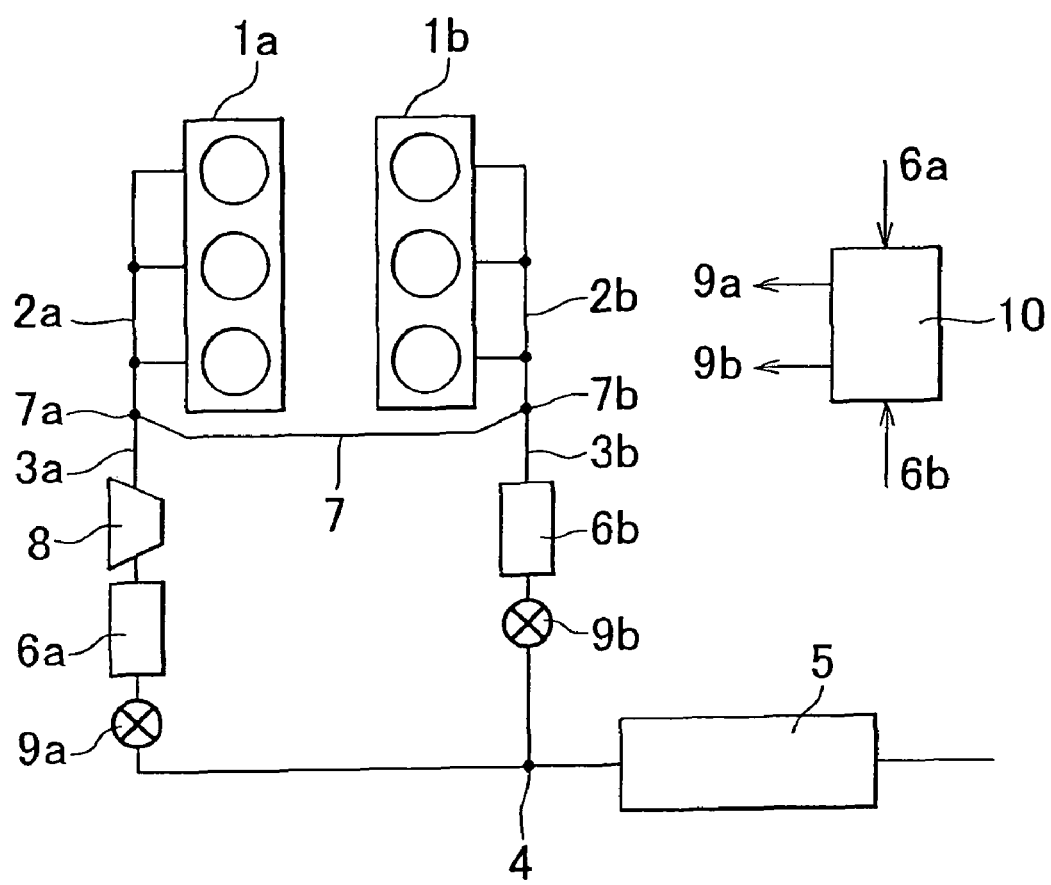
FIG. 1 is a schematic view showing an exhaust system of an internal combustion engine according to one embodiment of the invention.

FIG. 1 is a schematic view showing an exhaust system of an internal combustion engine according to one embodiment of the invention. In FIG. 1, the internal combustion engine in the form of a V-type engine includes a first bank 1a and a second bank 1b, and a first exhaust manifold 2a and a second exhaust manifold 2b are connected to the first bank 1a and the second bank 1b, respectively. A first exhaust passage 3a is connected to the first exhaust manifold 2a, and a second exhaust passage 3b is connected to the second exhaust manifold 2b. The first exhaust passage 3a and the second exhaust passage 3b join together at an exhaust merging point 4, and a main catalytic converter 5 is disposed downstream of the exhaust merging point 4.

The V-type engine mainly operates at a stoichiometric air/fuel ratio. A three-way catalytic converter is selected as the main catalytic converter 5. The main catalytic converter 5 is relatively large in size, but this does not cause a problem in terms of vehicle installation efficiency since the converter 5 is mounted under the floor of the vehicle. Thus, the main catalytic converter 5 favorably treats a large amount of exhaust gas emitted from respective cylinders during middle- or high-load operation of the engine.

However, exhaust gas emitted from the respective cylinders during low-load engine operation has a relatively low temperature, and its temperature is further reduced by the time the exhaust gas flows into the main catalytic converter 5. In this case, therefore, the main catalytic converter 5 cannot be kept at a catalyst activation temperature or its operating temperature, resulting in insufficient treatment or cleanup of the exhaust gas.

In the present embodiment, a first auxiliary catalytic converter 6a acting as a three-way catalytic converter is mounted near the engine body in the first exhaust passage 3a, and a second auxiliary catalytic converter 6b is mounted near the engine body in the second exhaust passage 3b. With this arrangement, when low-load engine operations are performed in the first bank 1a and second bank 1b, the resulting exhaust gas having a relatively low temperature flows into the first auxiliary catalytic converter 6a and second catalytic converter 6b which are located near the engine body, before the gas temperature is further reduced. As a result, catalysts carried on the respective catalytic converters 6a, 6b are kept at the activation temperature, and the exhaust gas produced at a low load can be sufficiently cleaned.

In the present embodiment, the first exhaust passage 3a and the second exhaust passage 3b communicate with each other via a connecting pipe 7 that connects a junction point 7a of the passage 3a with a junction point 7b of the passage 3b. A turbine 8 of a turbocharger is disposed in the first exhaust passage 3a between the junction point 7a and the first auxiliary catalytic converter 6a. Also, a first control valve 9a is disposed in the first exhaust passage 3a downstream of the first auxiliary catalytic converter 6a. The first control valve 9a adjusts the amount of exhaust gas passing through the first exhaust passage 3a such that the lower limit of the exhaust gas amount is equal to zero, and may be disposed anywhere in the first exhaust passage 3a provided that it is located downstream of the junction point 7a.

A second control valve 9b is disposed in the second exhaust passage 3b downstream of the second auxiliary catalytic converter 6b. The second control valve 9b adjusts the amount of exhaust gas passing through the second exhaust passage 3b such that the lower limit of the exhaust gas amount is equal to zero, and may be disposed anywhere in the second exhaust passage 3b provided that it is located downstream of the junction point 7b. The degrees of opening of the first control valve 9a and second control valve 9b are controlled by a controller 10 as shown in FIG. 1.

A compressor (not shown) of the turbocharger coupled to the turbine 8 is disposed upstream of a throttle valve of an engine intake system, and performs supercharging. By controlling the degrees of opening of the first control valve 9a and second control valve 9b, the amount of exhaust gas passing the turbine 8 of the first exhaust passage 3a can be controlled as desired, namely, can be changed from a condition in which no exhaust gas passes the turbine 8 (which condition is established by fully closing the first control valve 9a and fully opening the second control valve 9b) to a condition in which exhaust gas of all of the cylinders passes the turbine 8 (which condition is established by fully opening the first control valve 9a and fully closing the second control valve 9a). In this manner, the boost pressure can be controlled depending upon the engine operating conditions by changing the amount of exhaust gas passing the turbine 8, even in the absence of a wastegate passage that is generally provided for bypassing the turbine 8.

When the engine is started, at least one of the first auxiliary catalytic converter 6a and the second auxiliary catalytic converter 6b needs to be warmed up to the catalyst activation temperature in a short time so as to start treatment of the exhaust gas at an early stage. In the engine body, therefore, the exhaust gas temperature is elevated through various startup controls, for example, by retarding the ignition timing, or increasing the amounts of intake air and fuel for raising the idle speed, and the exhaust gas having a relatively high temperature is passed exclusively through the first auxiliary catalytic converter 6a or the second auxiliary catalytic converter 6b. In this connection, the controller 10 determines whether the first auxiliary catalyst device 6a and the second auxiliary catalytic converter 6b have been warmed up.

If the exhaust gas of all of the cylinders is entirely fed to the first auxiliary catalytic converter 6a of the first exhaust passage 3a in the exhaust system constructed as described above, the exhaust gas passes the turbine 8 located upstream of the first auxiliary catalytic converter 6a before flowing into the converter 6a, and, therefore, the first auxiliary catalytic converter 6a cannot be favorably warned up due to a reduction of the gas temperature that occurs when the exhaust gas passes the turbine 8.

In the present embodiment, therefore, the first control valve 9a is fully closed and the second control valve 9b is fully opened at the same time as or before start of cranking, so that the exhaust gas emitted from all of the cylinders during startup of the engine is caused to mainly pass the second auxiliary catalytic converter 6b of the second exhaust passage 3b. In this manner, the exhaust gas of all of the cylinders, which has a relatively high temperature, passes almost exclusively through the second auxiliary catalytic converter 6b without suffering a temperature reduction due to its passage through the turbine, so that the second auxiliary catalytic converter 6b can be warmed up in a short time.

If the exhaust gas of all of the cylinders is treated or cleaned by the second auxiliary catalytic converter 6b during the above-described startup control (such as ignition-timing retarding) and normal idling following the startup control, and, additionally, during low-load operation while the vehicle is running, the first auxiliary catalytic converter 6a disposed in the first exhaust passage 3a may be omitted. However, even in the case where the first auxiliary catalytic converter 6a is omitted, the first control valve 9a is opened by a desired degree if the turbocharger needs to perform supercharging during low-load operation, so that part of the exhaust gas is caused to pass the turbine 8. As a result, the exhaust gas may be released to the atmosphere without being fully cleaned up by the main catalytic converter 5.

In the meantime, during engine startup initiated by cranking, a relatively large amount of fuel is supplied to each cylinder so as to prevent misfire due to insufficient fuel vapors in the cylinder until the startup is completed, namely, until the engine speed is raised to a set speed through one or several-time explosion(s) in each cylinder, or until immediately after completion of the startup. In this case, the exhaust gas emitted until immediately after completion of engine startup contains a relatively large amount of particulate-like fuel. If such exhaust gas flows into the first auxiliary catalytic converter 6a that has not been warmed up, the particulate-like fuel is hardly removed from the exhaust gas, but may be released to the atmosphere. In order to suppress or restrict emission of the exhaust gas that has not been sufficiently cleaned up, an HC adsorption device may be disposed in the first exhaust passage 3a downstream of the turbine 8. In the case where the HC adsorption device is provided, the first control valve 9a is fully opened and the second control valve 9b is fully closed upon start of the engine, so as to cause exhaust gas of all of the cylinders to entirely pass through the first exhaust passage 3b from cranking until immediately after completion of engine startup, so that the particulate-like fuel contained in the exhaust gas is adsorbed by the HC adsorption device.

The HC adsorption device may have a honeycomb structure formed of a material (for example, mordenite as one type of zeolite) having a porous structure, such as that of zeolite, and having a large specific surface area. In the honeycomb structure, a large number of axial spaces or parallel channels that are defined by a large number of partition walls extending in the axial direction are formed.

The HC adsorption device having the honeycomb structure as described above is capable of favorably adsorbing liquid fuel in the form of particulates on the surfaces or in the pores of the partition walls at low temperatures. As the temperature of the HC adsorption device increases with the engine operating at a middle or high load, the adsorbed liquid fuel is vaporized, and is released as gaseous fuel. Since the main catalytic converter 5 disposed downstream of the exhaust merging point 4 has been heated to the activation temperature by this time, the catalytic converter 5 is able to favorably remove the gaseous fuel from the exhaust gas.

If the first auxiliary catalytic converter 6a is omitted, as described above, the exhaust gas that has passed the turbine 8 of the first exhaust passage 3a when the turbocharger performs supercharging during low-load engine operation may not be sufficiently cleaned. To favorably clean the exhaust gas, therefore, it is desirable to provide the first auxiliary catalytic converter 6a in the first exhaust passage 3a downstream of the turbine 8, as in the present embodiment. The HC adsorption device as described above may carry a catalyst or may be covered with a catalytic coating, to thus provide the first auxiliary catalytic converter 6a downstream of the turbine 8.

Figure 2:
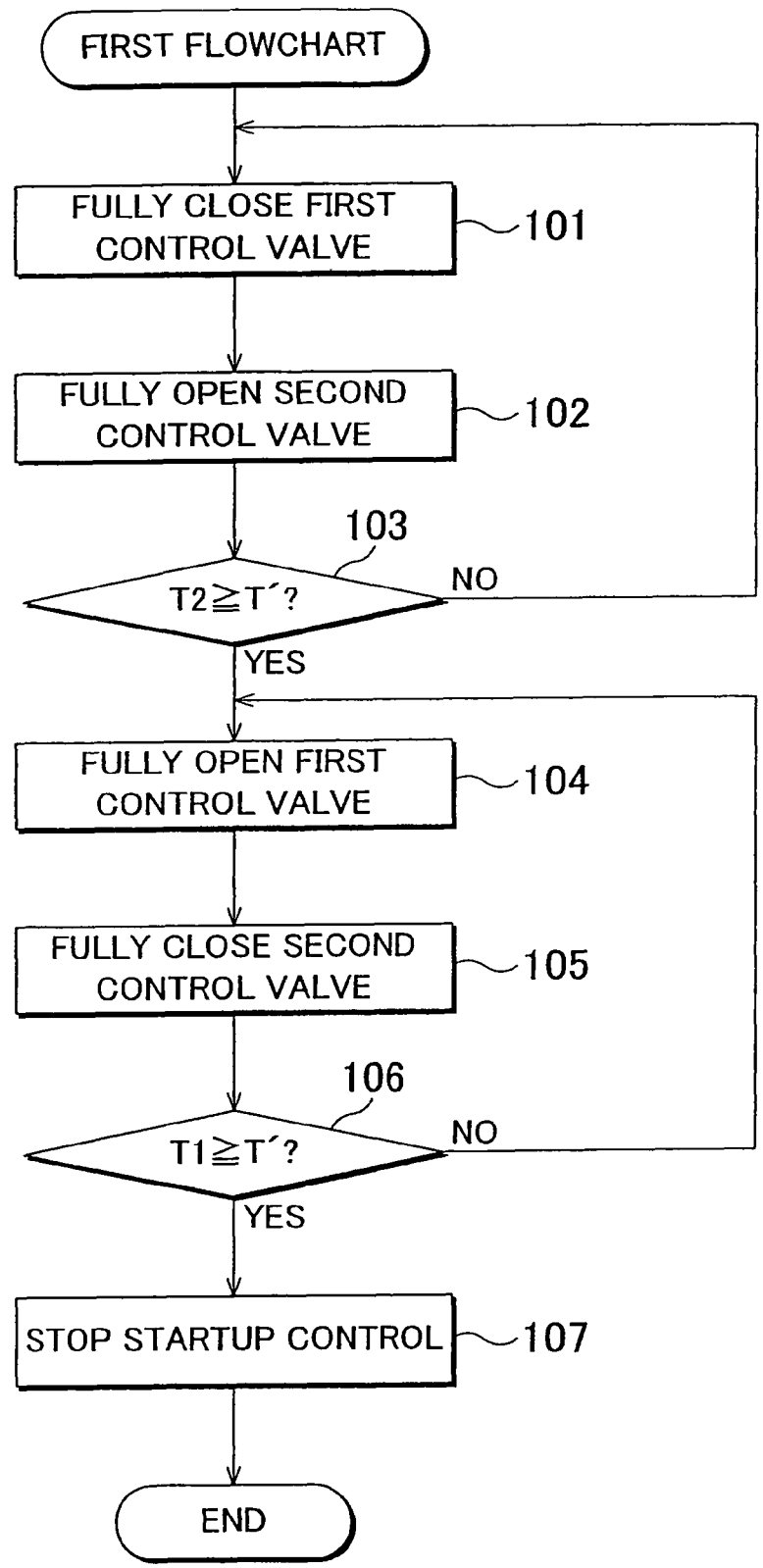
FIG. 2 is a first flowchart used for controlling a first control valve and a second control valve.

When the first auxiliary catalytic converter 6a is provided in the first exhaust passage 3a, the first auxiliary catalytic converter 6a needs to be warmed up in preparation for low-load engine operation during running of the vehicle. In the present embodiment, therefore, the controller 10 controls the opening amounts of the first control valve 9a and the second control valve 9b during startup of the engine, according to a routine illustrated in the first flowchart as shown in FIG. 2. The routine of the first flowchart starts being executed at the same that the starter switch is turned on. Initially, the first control valve 9a is fully closed in step 101, and the second control valve 9b is fully opened in step 102 (these controls may be performed immediately before stop of the engine).

As a result, the entire exhaust gas of all of the cylinders passes through the second exhaust passage 4b, and the second auxiliary catalytic converter 6b disposed in the second exhaust passage 3b is favorably warmed up. In this connection, the second auxiliary catalytic converter 6b preferably has a lower heat capacity (or is preferably smaller in size) than the first auxiliary catalytic converter 6a, so that the second auxiliary catalytic converter 6b can be easily warmed up.

Next, it is determined in step 103 whether the measured or estimated temperature T2 of the second auxiliary catalytic converter 6b has reached a warm-up completion temperature (catalyst activation temperature) T'. Until an affirmative decision (YES) is obtained in step 103, the first control valve 9a is kept fully closed and the second control valve 9b is kept fully opened. As described above, the controller 10 determines whether the first auxiliary catalytic converter 6a and the second auxiliary catalytic converter 6b have been warmed up. If an affirmative decision (YES) is obtained in step 103, the first control valve 9a is fully opened in step 104, and the second control valve 9b is fully closed in step 105. As a result, the entire exhaust gas of all of the cylinders passes through the first exhaust passage 3a, and passes the first auxiliary catalytic converter 6a only. In this manner, the first auxiliary catalytic converter 6a can be warmed up at an early stage.

Next, it is determined in step 106 whether the measured or estimated temperature T1 of the first auxiliary catalytic converter 6a has reached the warm-up completion temperature T'. Until an affirmative decision (YES) is obtained in step 106, the first control valve 9a is kept fully opened and the second control valve 9b is kept fully closed. If an affirmative decision (YES) is obtained in step 106, engine startup control, such as ignition-timing retarding, for elevating the exhaust gas temperature is stopped, and the routine of the flowchart of FIG. 2 is finished.

In the flowchart of FIG. 2, when the temperature T2 of the second auxiliary catalytic converter 6b and the temperature T1 of the first auxiliary catalytic converter 6a are estimated, the amount and temperature of the exhaust gas flowing into each of the catalytic converters 6a, 6b are taken into consideration. For example, the temperature of the exhaust gas flowing into the first auxiliary catalytic converter 6a is estimated in view of a temperature reduction that occurs when the exhaust gas passes the turbine. In step 103, it may be determined that the temperature of the second auxiliary catalytic converter 6b has been elevated to the warm-up completion temperature T' when the period of time for which the exhaust gas of all of the cylinders passes the converter 6b reaches a set time. Here the above-mentioned period of time does not include a period of time that ends immediately after startup of the engine is completed in the case where the exhaust gas of all of the cylinders passes the first auxiliary catalytic converter 6a acting as an HC adsorption device until immediately after completion of the engine startup. Similarly, it may be determined in step 106 whether the temperature of the first auxiliary catalytic converter 6a has been elevated to the warm-up completion temperature T', depending upon whether a period of time for which the exhaust gas passes the converter 6a has reached a set time.

When the temperature of the second auxiliary catalytic converter 6b becomes equal to the warm-up completion temperature T', and an affirmative decision (YES) is obtained in step 103, the opening amounts of the first control valve 9a of the first exhaust passage 3a and the second control valve 9b of the second exhaust passage 3b may be controlled so that the amount of exhaust gas passing through the first exhaust passage 3a becomes equal to or larger than that of exhaust gas passing through the second exhaust passage 3b. As a result, the exhaust gas whose amount is equal to or larger than that of the exhaust gas passing the second auxiliary catalytic converter 6b is caused to pass the first auxiliary catalytic converter 6a, so that warm-up of the first auxiliary catalytic converter 6a can be completed in a relatively short time. Furthermore, part of the exhaust gas passes the second auxiliary catalytic converter 6b, whereby the second auxiliary catalytic converter 6b can be surely kept in a warmed-up condition.

FIG. 3 is the second flowchart used for controlling the opening amounts of the first control valve 9a and the second control valve 9b during startup of the engine. In the following, only a difference from the first flowchart will be explained. According to a routine illustrated in the flowchart of FIG. 3, when it is determined in step 203 that the temperature T2 of the second auxiliary catalytic converter 6b has reached the warm-up completion temperature T', it is determined in step 204 whether the time t that has elapsed from turn-on of the starter switch has reached a set time t' it takes to carry out startup control for elevating the exhaust gas temperature.

If an affirmative decision (YES) is obtained in step 204, the startup control is stopped in step 210, and the routine of the flowchart of FIG. 3 is finished. If a negative decision (NO) is obtained in step 204, it is determined in step 205 whether the measured or estimated temperature T2 of the second auxiliary catalytic converter 6b is equal to or higher than the measured or estimated temperature T1 of the first auxiliary catalytic converter 6a.

When step 205 is initially executed, an affirmative decision (YES) is obtained since warm-up of only the second auxiliary catalytic converter 6b has just been completed. The control then proceeds to step 206 to fully open the first control valve 9a, and to step 207 to fully close the second control valve 9b. As a result, the entire exhaust gas of all of the cylinders passes through the first exhaust passage 3a, so as to warm up the first auxiliary catalytic converter 6a. The process from step 204 to step 207 is repeated so that the temperature T1 of the first auxiliary catalytic converter 6a reaches the warm-up completion temperature T'. During this process, the temperature T2 of the warmed-up second auxiliary catalytic converter 6b may be reduced to be lower than the warm-up completion temperature T'. In this case, a negative decision (NO) is obtained in step 205, and the first control valve 9a is fully closed in step 208 while the second control valve 9b is fully opened in step 209. As a result, the entire exhaust gas of all of the cylinders passes through the second exhaust passage 3b, so as to warm up the second auxiliary catalytic converter 6b again.

According to the flowchart of FIG. 3, during the period in which the exhaust gas temperature is elevated under engine startup control, the exhaust gas of all of the cylinders is caused to pass one of the first and second auxiliary catalytic converters 6a, 6b which has the lower temperature. With this control, the temperature T1 of the first auxiliary catalytic converter 6a and the temperature T2 of the second auxiliary catalytic converter 6b become substantially equal to each other. As a result, the catalysts contained in the first auxiliary catalytic converter 6a and the second auxiliary catalytic converter 6b are activated by substantially the same degree.

According to the flowchart of FIG. 3, the opening amounts of the first control valve 9a and the second control valve 9b are controlled so as to pass the exhaust gas of all of the cylinders through only one of the first auxiliary catalytic converter 6a and the second auxiliary catalytic converter 6b, based on the result of determination of step 205. However, the manner of controlling the opening amounts of the first and second control valves 9a, 9b is not limited to this manner, but the opening amounts of the first control valve 9a and the second control valve 9b may be controlled so as to pass the larger amount of exhaust gas through one of the first and second auxiliary catalytic converters 6a, 6b whose measured or estimated temperature is lower than the other. In this manner, the exhaust gas is allowed to pass the second auxiliary catalytic converter 6b even while the first auxiliary catalytic converter 6a is being warmed up, so that the second auxiliary catalytic converter 6b can be surely kept at the warm-up completion temperature.

After the startup control is stopped in the first and second flowcharts, the degrees of opening of the first control valve 9a and second control valve 9b are determined in accordance with the amount of exhaust gas passing through the first exhaust passage 4a, based on the amount of exhaust gas emitted from the cylinders, so as to achieve a desired boost pressure that is determined based on the engine operating conditions. Here, if the amount of exhaust gas emitted from the cylinders does not change, the amount of exhaust gas that passes the turbine 8 decreases as the degree of opening of the first control valve 9a is reduced (preferably, by fully opening the second control valve 9b), and the amount of exhaust gas passing the turbine 8 increases as the degree of opening of the second control valve 9a is reduced (preferably, by fully opening the first control valve 9a).

Thus, after the startup control is stopped and startup of the engine is finished, the opening amounts of the first control valve 9a and the second control valve 9b are controlled so as to achieve the desired boost pressure. At this time, the exhaust gas passing through the first exhaust passage 3a is favorably cleaned by the first auxiliary catalytic converter 6a that has been warmed up through control of the first or second flowchart. Also, the exhaust gas passing through the second exhaust passage 3b is favorably cleaned by the second auxiliary catalytic converter 6b that has been warmed up through control of the first or second flowchart.

While the first control valve 9a or the second control valve 9b is fully closed so that the entire exhaust gas of all of the cylinders passes the second auxiliary catalytic converter 6b or the first auxiliary catalytic converter 6a according to the first flowchart and the second flowchart, the first or second control valve 9a, 9b may be slightly opened so that a slight amount of exhaust gas passes the first auxiliary catalytic converter 6a or the second auxiliary catalytic converter 6b. Namely, there is no particular problem if the exhaust gas of all of the cylinders mainly passes the second auxiliary catalytic converter 6b or the first auxiliary catalytic converter 6a.

While the main catalytic converter 5 is in the form of a three-way catalytic converter in the illustrated embodiment, it may be in the form of a NOx catalytic converter in the case where the internal combustion engine is capable of lean-burn operation. In this case, if the engine operates at a stoichiometric air/fuel ratio or a rich air/fuel ratio at an extremely high load, for example, the main catalytic converter 5 is preferably a combination of a three-way catalytic converter and a NOx catalytic converter that are arranged in series. While startup control, such as ignition-timing retarding, for elevating the exhaust gas temperature is performed during startup of the engine in the illustrated embodiment, the invention is also applicable to the case where the startup control is not performed.

While the internal combustion engine is a V-type engine in the illustrated embodiment, the invention is not limitedly applied to this type of engine, but may be applied to any type of engine provided that the engine has a plurality of cylinders that can be divided into two groups, each of which is provided with an exhaust manifold. The plurality of cylinders may be arranged in series. The invention may also be applied to engines having three or more groups of cylinders. In this case, three or more exhaust passages upstream of the exhaust merging point are roughly divided into two groups, so that the invention can be applied to this type of engine.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. An exhaust system of an internal combustion engine having a plurality of cylinders, comprising:
    a first cylinder group and a second cylinder group which constitute all of the cylinders of the engine;
    a first exhaust passage and a second exhaust passage that are connected to respective exhaust manifolds of the first cylinder group and the second cylinder group, the first exhaust passage and the second exhaust passage having respective junction points through which the first and second exhaust passages communicate with each other;
    a turbine of a turbocharger disposed downstream of the junction point of the first exhaust passage;
    a first control valve disposed downstream of the junction point of the first exhaust passage;
    a second control valve disposed downstream of the junction point of the second exhaust passage;
    an HC adsorption device, having a first heat capacity, disposed in the first exhaust passage downstream of the turbine;
    an auxiliary catalytic converter, having a second heat capacity, disposed in the second exhaust passage upstream of the second control valve, the second heat capacity being lower than the first heat capacity; and
    a controller that controls opening amounts of the first control valve and the second control valve so that exhaust gas of all of the cylinders mainly passes the HC adsorption device during a period from cranking to a point in time immediately after completion of startup of the engine.

2. An exhaust system of an internal combustion engine according to claim 1, wherein
    a catalyst is carried on the HC adsorption device.

* * * * *